F. H. BROWN.
Cotton-Planter.
No. 58,372.
Patented Oct. 2, 1866.
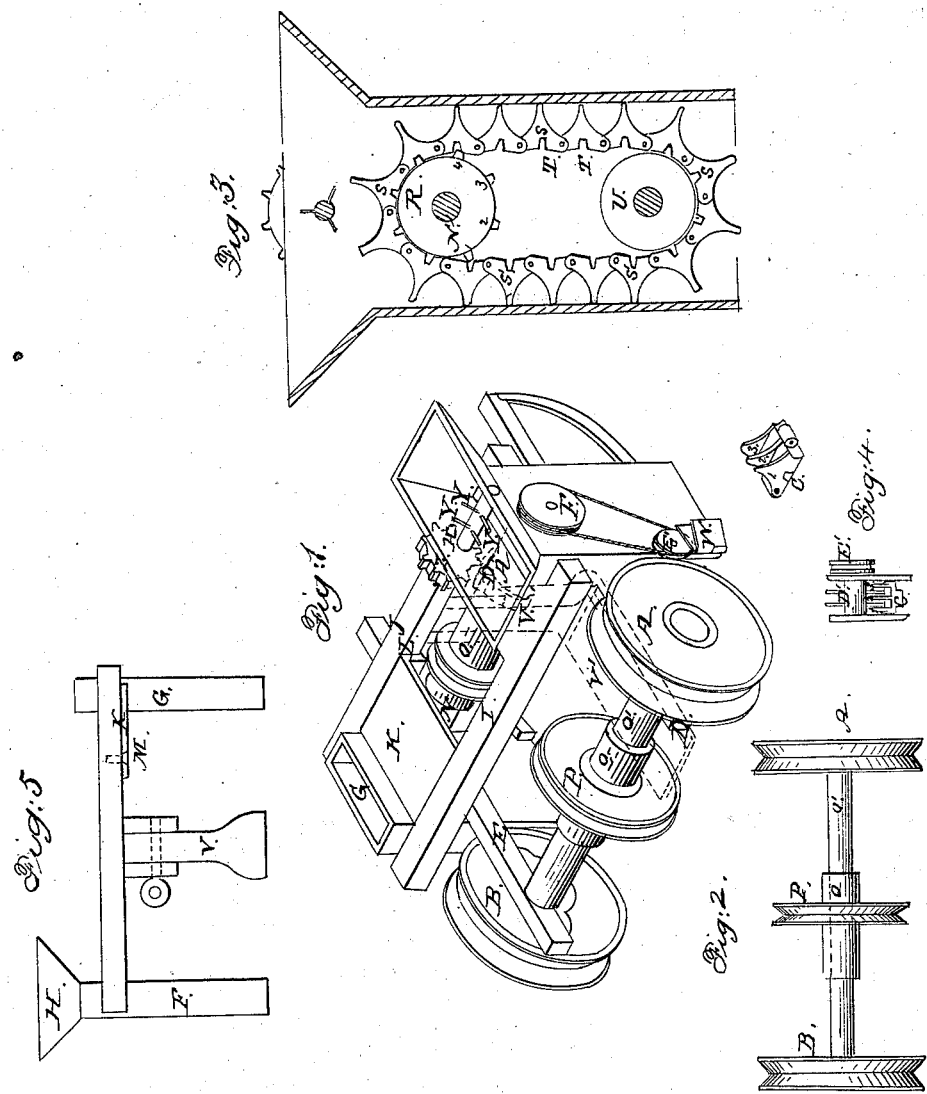

UNITED STATES PATENT OFFICE.

FREDERICK H. BROWN, OF AUBURN, NEW YORK.

IMPROVEMENT IN COTTON-SEED PLANTERS.

Specification forming part of Letters Patent No. 58,372, dated October 2, 1866.

*To all whom it may concern:*

Be it known that I, FREDERICK H. BROWN, of the city of Auburn, in Cayuga county, State of New York, have invented a new and Improved Mode of Planting Cotton-Seed; and I do hereby declare the following to be a full, clear, and exact description of the same, reference being had to the accompanying drawings, making a part of this specification, and to the letters of reference marked thereon.

The primary object of this invention is to combine certain machinery in such manner that the operator thereof may plant two rows of seeds in the same time required to plant one; and in order that others skilled in the art may know how to make and use my invention, I will proceed to describe its construction and mode of operation.

This invention relates, first, to making the devices for dropping the seed adjustable as to the width of the rows, in such manner that the operator may plant the rows at any required distance from each other; second, constructing the machine with a device such that the operator may put the seed into the ground at any required depth; third, covering the seed at the same time the dropping is done; fourth, pressing the soft ground onto the seed sufficiently to cause it to take root rapidly; fifth, the use of an endless chain of peculiar constructed links, with points projecting from each, to be hereinafter described, for carrying the cotton-seed from the hopper to the ground; sixth, operating the shaft with arms situated in the hopper containing the cotton-seed by sudden movements by means of a lug on a shaft engaging a tooth in a wheel on the end of said shaft.

The object of thus suddenly starting and stopping this shaft is for the purpose of more perfectly disintegrating or separating the seeds one from the other, preparatory to dropping. This may be done by other analogous means, such as a pawl and ratchet, without in any manner changing the nature of my invention, as this consists in the sudden starting and stopping of the said shaft with arms, without reference to the means employed to accomplish it.

Figure 1 is a perspective view of the machine. A and B are the driving-wheels, secured to the shaft C, at the ends thereof. Said shaft supports the machine in the rear by means of the arms D and E, which pass under the machine. F and G are the tubes for conveying the seed from the hopper H down to the ground.

I have shown one of the hoppers only, the one on the other tube, G, being the same as the one at H. The tube F is secured firmly to the cross-bars I and J. The carrying-tube G is secured to the slide K. Said slide is made the full width between the cross-bars I and J, and is turned down along the sides, and from thence passes under them, as shown at L, and is secured thereto by means of the screws M, Fig. 5. Said screws pass through a slot in slide K.

The cross-bar E is secured to the conveying-tube G. The shafts C and N are both made adjustable as to length by means of a tube, O, forming the center of each. (See Fig. 2, which is a plan of the shaft C, the two wheels A, and socket O.) The dotted lines in said socket represent the socket O as inclosing the shaft, which may be drawn out or in at pleasure.

By loosening the screws M the slide K may be moved in either direction. This makes the machine adjustable. The pulley P on the socket O drives, by means of a band or belt, the pulley Q on the shaft N. This shaft has its bearings on the inner sides of the carrying-tubes F and G, and on each extreme end thereof and inside the said carrying-tubes is a toothed wheel, R. (See Fig. 3.) This figure represents the internal arrangement of the carrying-tubes. It has the outside covering removed in order to show the arrangements of the parts.

The carrying-chain S is constructed of links, one of which is shown at Fig. 4. Said links have apertures or spaces T in the under or inside of each link, which engages the teeth 1 2 3 4, &c., on the wheels R on the end of the shaft N. The chain S is therefore driven by the wheel R, and passes around the wheel U, which keeps it taut and uniform in its action. The object of this chain is to carry the cotton-seed from the hopper and deposit it on the ground in a channel or furrow made to receive it.

The depth of the furrow depends upon the altitude of the regulator V. (Shown in Fig. 1 in red dotted lines and in Fig. 5.) The horizontal piece V runs on the surface of the ground.

The driving-wheels A and B are placed immediately behind the carrying-tubes, and as the machine moves forward the seed dropped by the chain S and covered by inclined wing-pieces on each side of the carrying-tubes, one of which is shown at W. The said wheels press the ground firmly around the seed, and make it germinate much sooner than it otherwise would.

It is proper to remark here that all the devices and arrangements of parts described and shown on one side of the machine are common to the other, except the arrangement for adjusting the width between the rows.

In the hopper H is a shaft, X, with arms Y projecting therefrom. On the end of said shaft is a toothed wheel, Z. On the shaft N is a ring, A'. Projecting from said ring is a lug, D'. Said lug, when the machine is in motion, engages at each revolution one of the teeth in the wheel Z. This gives to said shaft a sudden starting and stopping movement, much better calculated to separate the cotton-seeds from each other than a uniform movement could do.

In Fig. 4, C' is one link of the carrying-chain S, having the teeth 1' 2' 3' projecting therefrom. D' is a shaft, with two sets of arms. Said arms pass between the points 1' 2' 3' in the chain S, for the purpose of removing the cotton-seed therefrom. Said shaft has a pulley, E', on the end thereof, and is driven by the pulley F' on the shaft N.

The shaft D', with the arms, has been made the subject of Letters Patent by me in a former application, and hence nothing further need be said about them here.

Having above described the construction and mode of operating my invention, what I claim as new, and wish to secure by Letters Patent, is—

1. The adjustable nature or character of the machine as to regulate the space between rows, in combination with the cotton-seed-planter, as above specified.

2. In cotton-seed planters, regulating the depth that the seed are deposited.

3. The mode described of constructing the endless chain, and its combination with the cotton-seed planter, as above set forth.

4. The peculiar movement given to the shaft X, above described, when used for the purpose above set forth.

FRED. H. BROWN.

Witnesses:
GEO. HUMPHREYS,
JOHN NICHOLS.